US012327905B2

(12) United States Patent
Wang et al.

(10) Patent No.: US 12,327,905 B2
(45) Date of Patent: Jun. 10, 2025

(54) INTEGRATED 5G ANTENNA SYSTEM AND COMMUNICATION NETWORK

(71) Applicants: PROSE TECHNOLOGIES (SUZHOU) CO., LTD., Suzhou (CN); PROSE TECHNOLOGIES LLC, Mount Olive, NJ (US)

(72) Inventors: Kun Wang, Suzhou (CN); Lishao Cai, Suzhou (CN); Xiaolin Lu, Suzhou (CN); Juniad Syed, Kirkcaldy Fife (GB); Jing Sun, Suzhou (CN)

(73) Assignees: PROSE TECHNOLOGIES (SUZHOU) CO., LTD., Suzhou (CN); PROSE TECHNOLOGIES LLC, Mount Olive, NJ (US)

( * ) Notice: Subject to any disclaimer, the term of this patent is extended or adjusted under 35 U.S.C. 154(b) by 579 days.

(21) Appl. No.: 17/784,964

(22) PCT Filed: May 8, 2019

(86) PCT No.: PCT/CN2019/086027

§ 371 (c)(1),
(2) Date: Jun. 13, 2022

(87) PCT Pub. No.: WO2020/223928

PCT Pub. Date: Nov. 12, 2020

(65) Prior Publication Data

US 2023/0275654 A1 Aug. 31, 2023

(51) Int. Cl.
*H01Q 1/12* (2006.01)
*H01Q 1/24* (2006.01)
*H01Q 21/28* (2006.01)

(52) U.S. Cl.
CPC ......... *H01Q 1/1242* (2013.01); *H01Q 1/1228* (2013.01); *H01Q 1/125* (2013.01); *H01Q 1/246* (2013.01); *H01Q 21/28* (2013.01)

(58) Field of Classification Search
CPC ...... H01Q 1/12; H01Q 1/1242; H01Q 1/1228; H01Q 1/125; H01Q 1/1264; H01Q 1/241;
(Continued)

(56) References Cited

U.S. PATENT DOCUMENTS

| | | | | |
|---|---|---|---|---|
| 9,807,032 | B2 * | 10/2017 | Merola | H04B 1/036 |
| 2009/0274130 | A1 | 11/2009 | Boch | |
| 2018/0183473 | A1 | 6/2018 | Laurent-Michel et al. | |

FOREIGN PATENT DOCUMENTS

| | | | |
|---|---|---|---|
| CN | 202095107 | U | 12/2011 |
| CN | 204441443 | U | 7/2015 |

(Continued)

OTHER PUBLICATIONS

The World Intellectual Property Organization (WIPO) International Search Report for PCT/CN2019/086027 Jan. 22, 2020 4 Pages (including translation).

*Primary Examiner* — Robert Karacsony
(74) *Attorney, Agent, or Firm* — ANOVA LAW GROUP, PLLC

(57) ABSTRACT

The present disclosure discloses an integrated 5G antenna system and a communication network, the 5G antenna system comprises a base station system and at least one microwave antenna system integrated on a holding pole. The base station system includes a radio remote unit and at least a base antenna electrically connected to the radio remote unit and configured to transmit 5G signals. Each microwave antenna system includes a radio frequency unit electrically connected to the base station antenna and a microwave antenna connected to the radio frequency unit. The present disclosure integrates the base station system, the microwave antenna system and the holding pole together to improve the integration of the antenna system, the whole communication network uses the microwave system for signal backhaul
(Continued)

[QW1], which reduces the cost of deploying the network and enhances the flexibility of networking.

12 Claims, 8 Drawing Sheets

(58) Field of Classification Search
CPC ........... H01Q 1/246; H01Q 1/42; H01Q 1/44; H01Q 3/04; H01Q 21/28; H01Q 5/30; H01Q 1/1207; H01Q 1/1214; H01Q 3/02–10
See application file for complete search history.

(56) References Cited

FOREIGN PATENT DOCUMENTS

| | | | | |
|---|---|---|---|---|
| CN | 204876690 | U | | 12/2015 |
| CN | 105228239 | A | | 1/2016 |
| CN | 106320784 | A | | 1/2017 |
| CN | 106888466 | A | | 6/2017 |
| CN | 208507961 | U | | 2/2019 |
| WO | 2008117973 | A1 | | 10/2008 |
| WO | WO2012159322 | | * | 11/2012 |
| WO | 2018074899 | A1 | | 4/2018 |

* cited by examiner

INTEGRATED 5G ANTENNA SYSTEM AND COMMUNICATION NETWORK

CROSS-REFERENCE TO RELATED APPLICATION

This application is a national stage application of PCT Patent Application No. PCT/CN2019/086027, filed on May 8, 2019, the entire content of which is incorporated herein by reference.

FIELD OF THE DISCLOSURE

The present disclosure relates to an antenna, in particular to an integrated 5G antenna system and a communication network.

BACKGROUND

At present, most of 3G/4G base stations adapt the networking mode by using RRU (Radio Remote Unit)+BBU (Building Base Band Unit) to create a wireless access network connected to the core network through a transmission network composed of fibers.

However, for regions which are difficult to obtain the wire transmission resource such as remote rural villages, islands, highways etc., if the traditional networking methods are still used, due to many physical interfaces, poor connection stability, it may cause poor stability and reliability of the entire network, meanwhile bring very bad mobile services to users, and if all the fiber backhaul is achieved, the cost is too high, especially in rural areas.

Moreover, with the arrival of the 5G era, in order to meet the needs of capacity, the new spectrums are being constantly introduced, but the resource of the antenna-platform is very limited, which drives the integration of the antenna to be further improved.

SUMMARY

The purpose of the present disclosure is to overcome the deficiencies of the prior art to provide an integrated 5G antenna system and a communication network.

To achieve the above object, the present disclosure provides the following technical solutions: an integrated 5G antenna system, wherein the integrated 5G antenna system comprises a base station system and at least one microwave antenna system integrated on a holding pole, the base station system includes a radio remote unit and at least a base antenna electrically connected to the radio remote unit and configured to transmit 5G signals, each microwave antenna system includes a radio frequency unit electrically connected to the base station antenna and a microwave antenna electrically connected to the radio frequency unit.

Preferably, there are two microwave antenna systems on the holding pole, and the two microwave antenna systems are located on the holding pole at a same height, the two microwave antenna systems are fixed on the holding pole by the same mounting bracket.

Preferably, there are two microwave antenna systems on the holding pole, and the two microwave antenna systems are distributed on the holding pole with a vertical dislocation, the two microwave antenna systems are fixed on the holding pole by the corresponding mounting brackets respectively.

Preferably, position adjustments of the two microwave antenna systems cannot be performed separately, or can be performed separately.

Preferably, the mounting bracket includes a holding portion configured to hold on the holding pole and a mounting portion configured to provide an mounting space for the microwave antenna system, the mounting portion is connected to the holding portion by a rotating shaft, the position adjustment of the microwave antenna system includes circumferentially rotating about the rotating shaft, rotating about its own vertical central axis, or a combination thereof.

Preferably, the base station system includes two base station antennas configured to transmit the 5G signals, the two base stations antennas are fixedly sleeved on the holding pole and uniformly distributed axially on the holding pole to form a whole direction antenna.

Preferably, the 5G antenna system further includes a beautifying member integrated on the top of the holding pole.

Preferably, the microwave antenna system is provided with a radome.

The present disclosure also discloses another technical solution: a communication network including a plurality of integrated 5G antenna systems configured to perform bidirectional communication to each other through the microwave antenna systems.

Preferably, the two microwave antenna systems of two adjacent integrated 5G antenna systems communicating with each other are located on the same or approximately same height.

The beneficial effect of the present disclosure is:

1. The present disclosure integrates the base station system (including a base station antenna that can transmit 5G signals), the microwave antenna system (including MMW radios and microwave antennas) and the holding pole to improve the integration.
2. The present disclosure combines the base station and the microwave to transmit the 5G signal, the base station achieves the backhaul by the microwave ultra-wide band without fiber, which improves the signal coverage, reduces the cost of the network, enhances the flexibility of the networking, improves the service quality, and greatly reduces operators' network cost and maintenance costs.

REFERENCE NUMERAL

Figure 1:
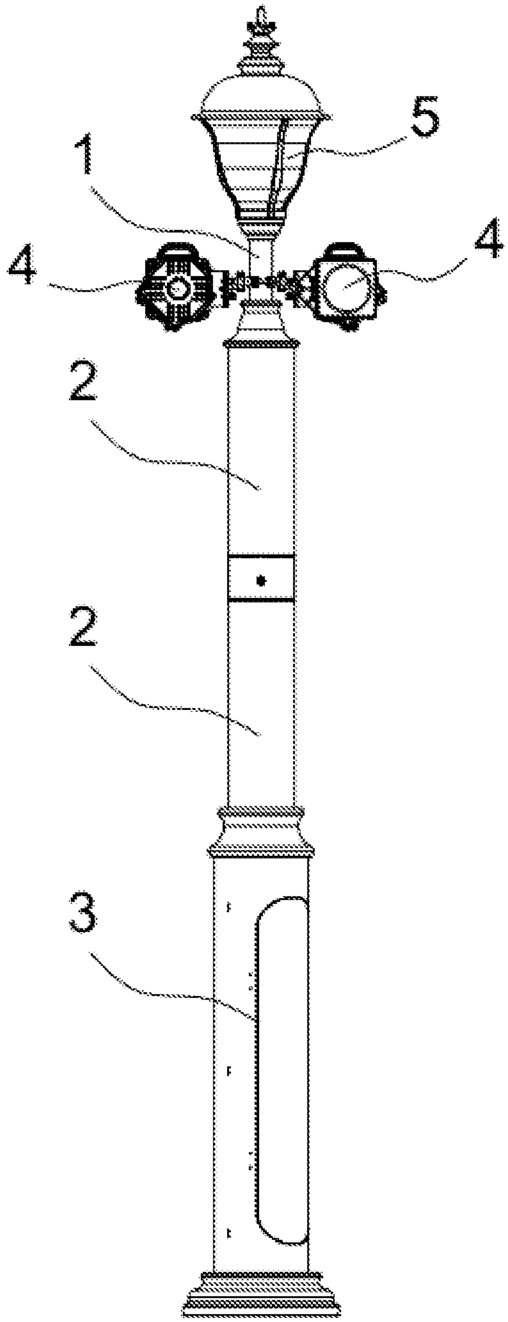
FIGS. 1 to 6 are structural diagrams of Embodiments 1 to 6 of the present disclosure, respectively.

1 holding pole, 2 base station antenna, 3 cover, 4 microwave antenna system, 5 street lamp, 6 radome, 7 mounting bracket, 100 remote computer room, 10 first 5G antenna system, 20 second 5G antenna system, 30 third 5G antenna system.

DETAILED DESCRIPTION

The technical solutions of the embodiments of the present disclosure will be described clearly and completely in conjunction with the drawings of the present disclosure.

An integrated 5G antenna system and a communication base station are disclosed in the present disclosure, a base station system (including a radio remote unit and a base station antenna that can transmit 5G signals), a microwave antenna system (including MMW radios, and a microwave antenna) are integrated with a holding pole to improve the integration of the antenna system; and the base station achieves the backhaul by the microwave ultra-wide band without fiber to improve the signal coverage ability and the flexibility of networking, and reduce the cost for distributing the network.

With reference to FIGS. 1 to 7, an integrated 5G antenna system disclosed in the present disclosure includes a base station system and at least one microwave antenna system 4 integrated on the holding pole 1. The base station system includes a radio remote unit (referred to as RRU, which is not shown in drawings) and at least one base station antenna 2 that can transmit 5G signals, the input end of the radio remote unit is connected to the building base band unit (referred to as BBU, which is shown as a remote computer room 100 in FIG. 8) through the fiber (not shown), and the output end of the radio remote unit is connected to the base station antenna 2 through the feed line (not shown) to receive the radio frequency analog signal processed (such as modulated, de modulated etc.) via the building base band unit and transmit the radio frequency analog signal after being amplified to the base station antenna 2.

The radio remote unit is mounted to the bottom of the holding pole 1, and a cover 3 is covered the radio remote unit, the cover 3 is cylindrical, i.e., the radio remote unit is disposed in the cover 3.

The base station antenna 2 (BSA) is integrated on the holding pole 1, and electrically connected to the RRU through the feed line to transmit the radio frequency signal to the microwave antenna system 4. In the implementation, the number of the base station antenna 2 can be one or more, for example, two base station antennas 2 can be provided, each base station antenna 2 is cylindrical, both of them are located above the radio remote unit, are fixedly sleeved on the holding pole, and are uniformly distributed axially on the holding pole.

Each microwave antenna system 4 includes a radio frequency unit (MMA Radio, which is not shown) electrically connected to the base station antenna 2 and a microwave antenna (such as Focal Plane Array, FPA, a millimeter wave focal plane array) electrically connected to the radio frequency unit, wherein the microwave antenna system 4 is disposed above the base station system (in the present embodiment, that is, the base station antenna 2); or is disposed below the base station antenna 2, of course, the position of the microwave antenna system 4 on the holding pole 1 is not limited to these two ways, the position which the microwave antenna system 4 is disposed on the holding pole 1 is based on its reference surface (such as the ground), and is determined in combination with the positions of the microwave antenna systems 4 of other 5G antenna systems which are adjacent to the 5G antenna system.

In the present embodiment, two microwave antenna systems 4 are provided on the holding pole 1, and the two microwave antenna systems 4 can be located on the same side or both sides of the holding pole during implementation, of course the positions of the two microwave antenna systems 4 relative to the holding pole 1 are not limited to these positions, each microwave antenna system 4 can be adjusted to the desired position as needed. When located on the both sides of the holding pole 1, the two microwave antenna systems 4 can be located on the holding pole at a same height or distributed on the holding pole with a vertical dislocation (i.e., a high position, a low position); additionally, the position adjustments of two microwave antenna systems 4 cannot be performed separately, or can be performed separately. When the position adjustment can be performed separately, the two microwave antenna systems 4 can adjust their own signal emission directions as needed separately, or the directions of the two microwave antenna systems 4 can be adjusted synchronously. In implementation, the microwave antenna (FPA) is operated in the E-band (e-band microwave) referred to the microwave frequency band near 80 GHz, and the actual allocation bands are two symmetric bands with 71-76 GHz and 81-86 GHz, which can reach the total bandwidth of 10 GHz and can meet the backhaul requirements of the 5G base station of 10-20 Gbps.

In implementation, the microwave antenna system 4 is fixed on the holding pole 1 by the mounting bracket 7, the mounting bracket 7 specifically includes a holding portion (not shown) to hold the holding pole 1 and a mounting portion (not shown) to provide the mounting position for the microwave antenna system, the mounting portion is connected to the holding portion through a rotating shaft (not shown). When the microwave antenna system 4 is adjusted, there are a variety of adjustment methods including circumferential rotating about the rotating shaft, rotating about its own vertical central axis, or a combination thereof. For example, when circumferential rotating about the rotating shaft of the mounting bracket 7, the two microwave antenna systems 4 can be rotated to the same side, both sides or other relative positions.

The structure of the 5G antenna system integrated in the present disclosure is specifically described in the following several embodiments.

Embodiment 1

As shown in FIG. 1, the integrated 5G antenna system of Embodiment 1 of the present disclosure in the form of a cylindrical structure whose bottom is fixed to the ground and vertically disposed specifically includes a radio remote unit, two base station antennas 2, and two microwave antenna systems 4 integrated on the holding pole, wherein the radio remote unit is disposed at the bottom of the holding pole 1, and located in a cover 3. The two base station antennas 2 are sleeved on the holding pole 1 and located above the radio remote unit, and the two base station antennas 2 are uniformly distributed axially on the holding pole 1, and the above base station antennas 2 and the radio remote unit are connected by the feed line, the two base station antennas 2 are connected by the feed line.

The two microwave antenna systems 4 are integrated on the holding pole 1, in Embodiment 1, two microwave antenna systems 4 are disposed above the two base station antennas 2, in particular, located at the top of the base station antenna 2, and respectively fixed to both sides of the holding pole 1 at a same height, and both of them cannot be adjusted separately, i.e., when the location of one of the microwave antenna systems 4 is adjusted, the location of the other microwave antenna system 4 is also adjusted synchronously. When adjusted, the two microwave antenna systems 4 are synchronized to circumferentially rotate about the rotating shaft of the mounting bracket 7. And when installed, the two microwave antenna systems 4 are mounted to the holding pole 1 by the same mounting bracket.

Of course, as alternatively, the two microwave antenna systems 4 may be fixed to the holding pole 1 by a corresponding mounting bracket 7, separately, as such, the positions of the two microwave antenna systems 4 on the holding pole can be adjusted separately, i.e., each of the two microwave antenna systems 4 circumferentially rotates about the rotating shafts of a corresponding mounting bracket 7, respectively.

In addition, the top of the holding pole 1 can also be provided with a beautifying member, such as a landscape lamp 6, so that the integrated 5G antenna system of the present disclosure not only wirelessly communicates, but also uses a landscape lamp for beautifying the city.

Embodiment 2

Figure 2:
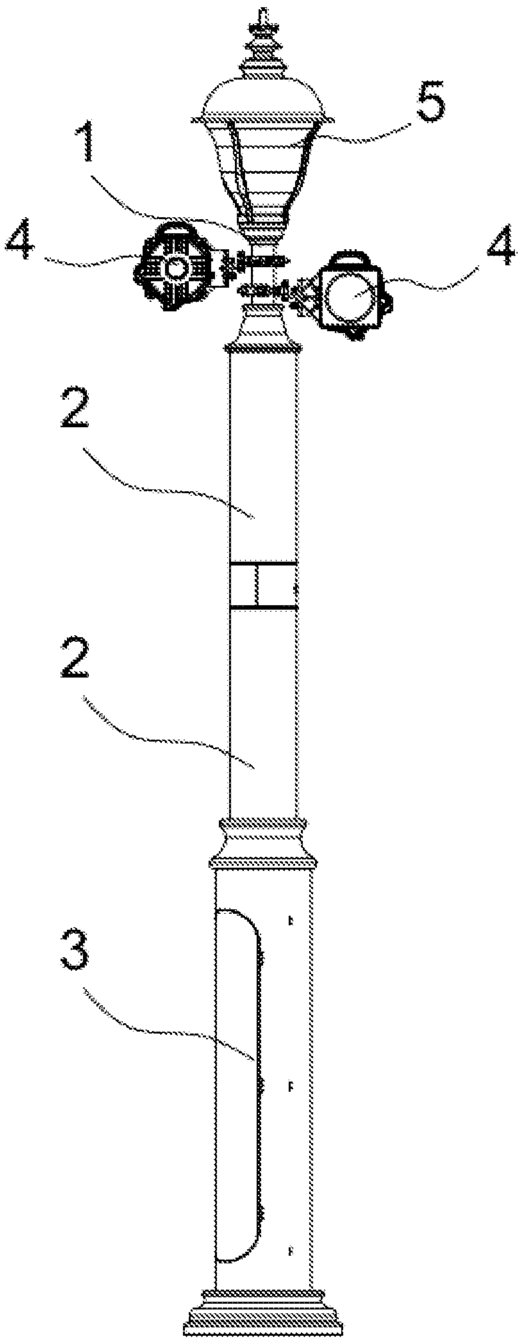
Figure 4:
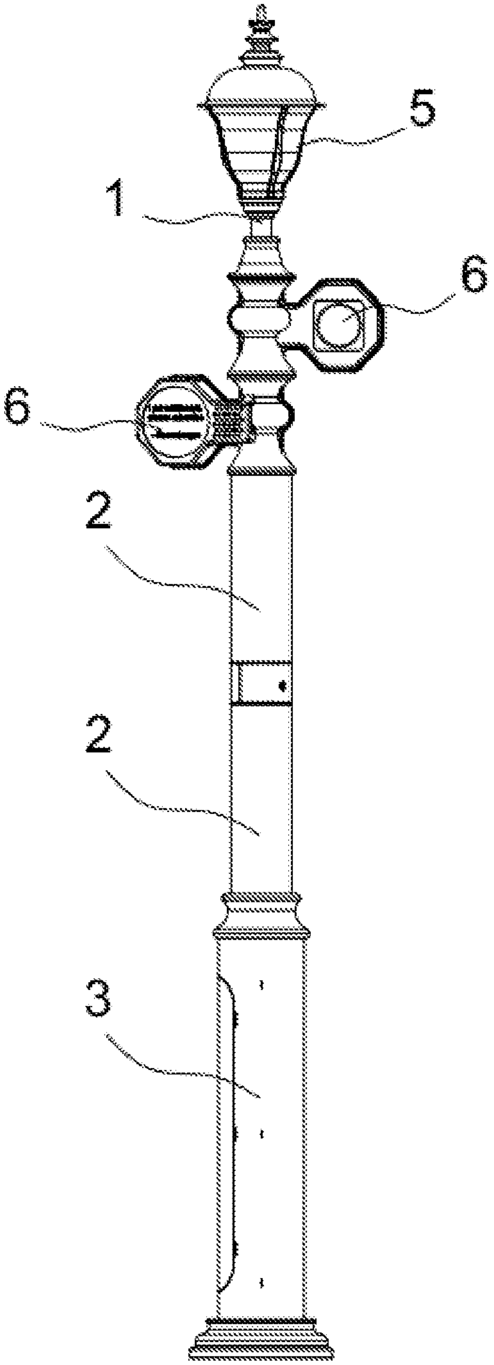
Figure 7:
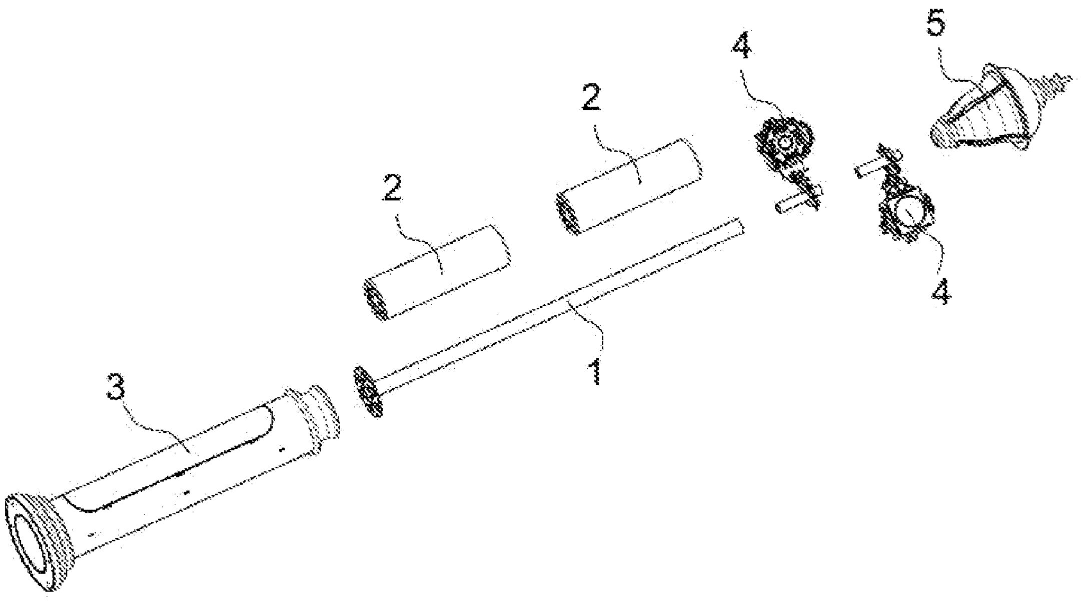
FIG. 7 is an exploded structural diagram of Embodiment 2 of the present disclosure.

In connection with FIGS. 2 and 7, unlike the above Embodiment 1, in Embodiment 2 of the present disclosure, two microwave antenna systems located on both sides of the holding pole 1 are distributed on the holding pole 1 with a vertical dislocation, in the present Embodiment 2, one of the microwave antenna systems 4 is on the upper left of the holding pole 1, the other microwave antenna systems 4 is on the lower right of holding pole 1, of course, as alternative, one of the microwave antenna systems 4 is on the lower left of the holding pole 1, the other microwave antenna systems 4 is on the upper right of holding pole 1, as shown in FIG. 4, the present disclosure is not limited by this.

Further, the positions of the two microwave antenna systems can be adjusted separately, i.e., when the location of one of the two microwave antenna systems 4 is adjusted, the location of the other microwave antenna system 4 can or cannot be adjusted. In this embodiment, the two microwave antenna systems 4 are fixed to the holding pole by a corresponding mounting bracket, respectively, and the locations of the two microwave antenna systems can be adjusted individually, i.e., each of the two microwave antenna systems 4 can circumferentially rotate about their own vertical central axis.

Embodiment 3

Figure 3:
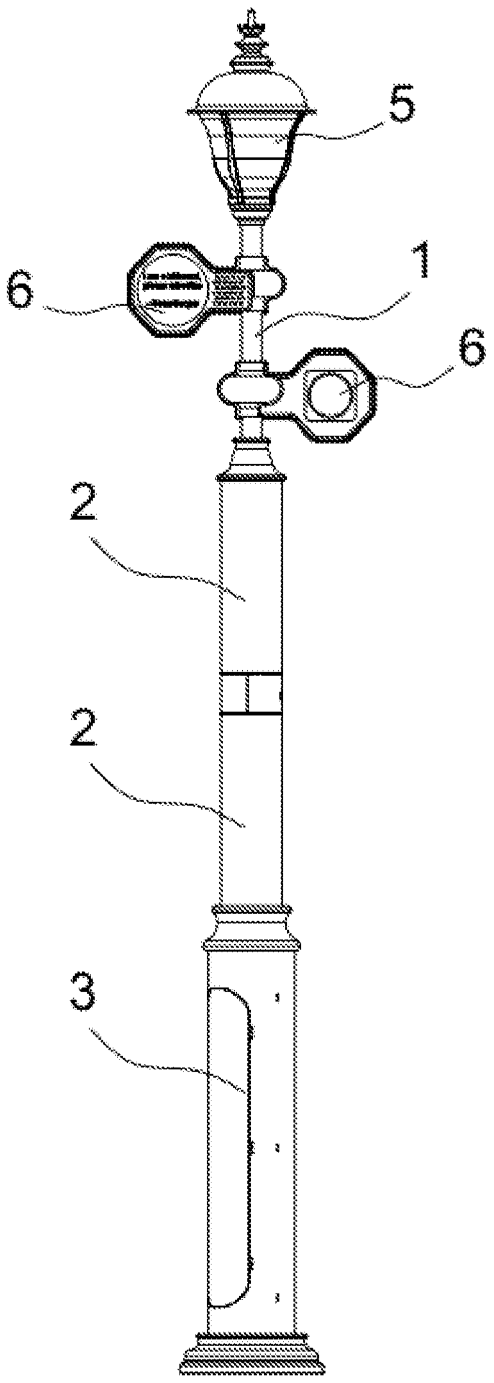

As shown in FIG. 3, unlike the above Embodiment 2, in Embodiment 3 of the present disclosure, the covers 6 are covered the outer surfaces of the two microwave antenna systems 4 to protect them from the external environment.

Embodiment 4

As shown in FIG. 4, unlike the above Embodiment 3, and in Embodiment 4 of the present disclosure, two microwave antenna systems are located on both sides of the holding pole 1 respectively, wherein one of the microwave antenna systems 4 is on the lower left of the holding pole 1, the other microwave antenna system is on the upper right of the holding pole 1, and the two microwave antenna systems 4 are not on the same plane, that is, their planes are different.

Embodiment 5

Figure 5:
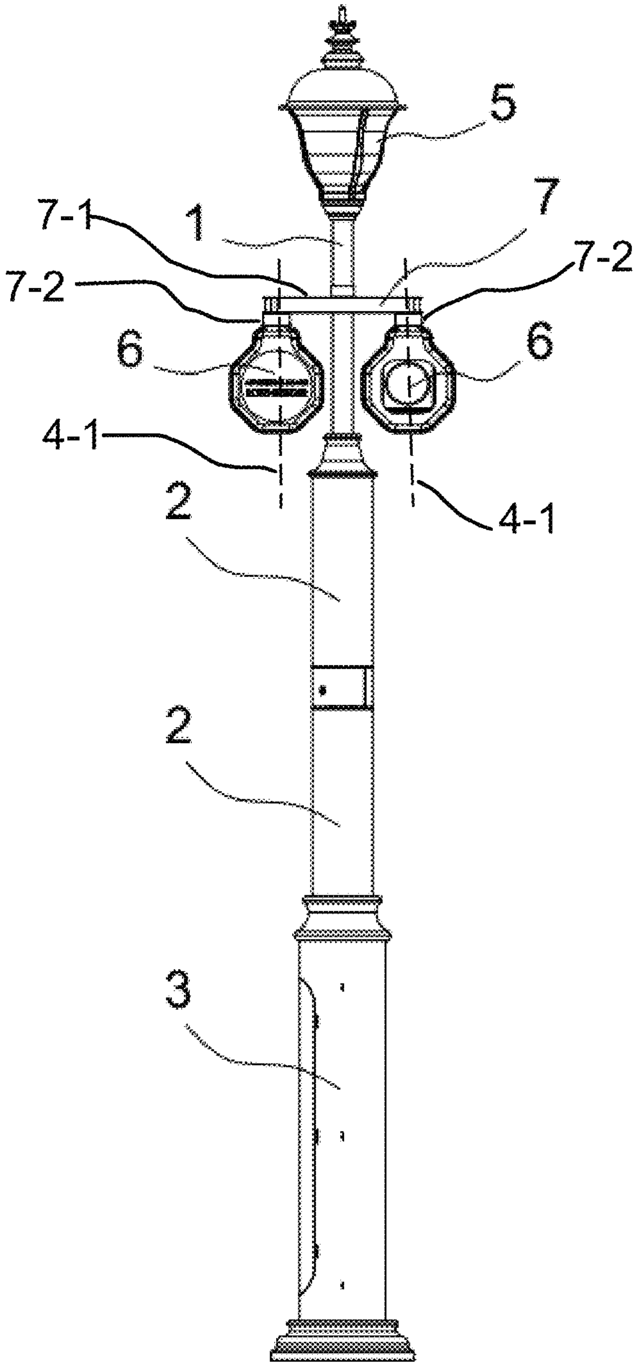

As shown in FIG. 5, unlike the above Embodiment 3, and in Embodiment 5 of the present disclosure, the two microwave antenna systems 4 located on both sides of the holding pole 1 are fixed to a common mounting bracket 7, the mounting bracket 7 is fixed to the holding pole 1 horizontally (i.e., vertically or approximately perpendicular to the direction of the holding pole 1) through a holding portion 7-1, the two microwave antenna systems 4 are fixed to both ends of the mounting bracket 7 through their respective horizontal mounting portion 7-2, that is, like two lanterns are hung on both sides of the holding pole 1, the two microwave antenna systems 4 both can be located on the same plane of the mounting bracket 7, or of course, on different planes of the mounting bracket 7, in Embodiment 5, they are located on the same plane, and the locations of them on the mounting bracket 7 can be adjusted individually. Specifically, the microwave antenna system 4 on each side can be rotated about its vertical center axis as the rotating shaft 4-1 independently. Of course, the two microwave antenna systems 4 can also perform corresponding tilt adjustments in the front-rear direction around the horizontal shaft of the mounting bracket 7.

Embodiment 6

Figure 6:
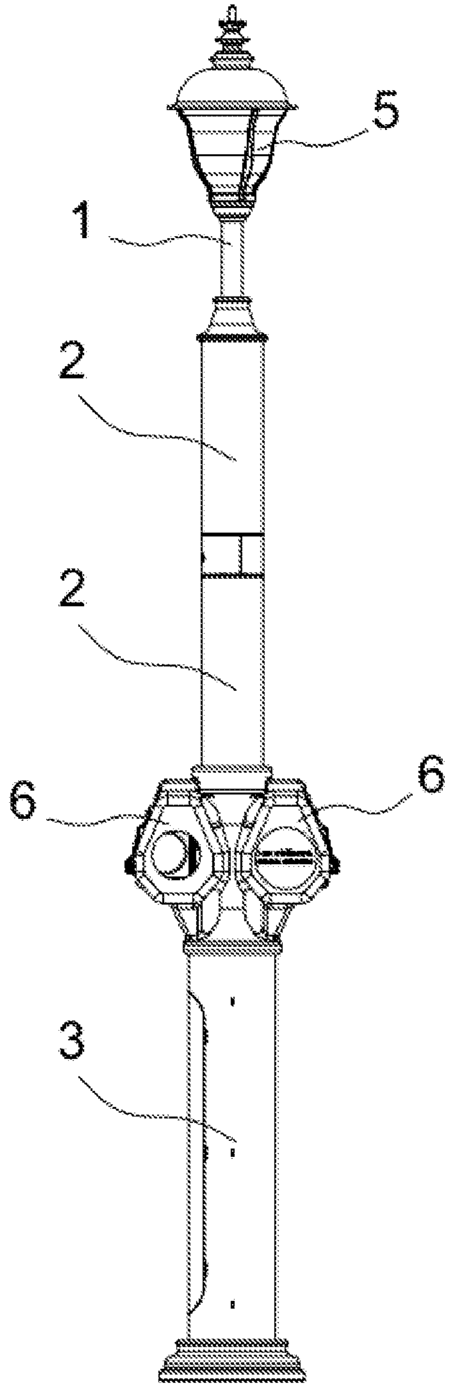

As shown in FIG. 6, unlike the above Embodiments 1 to 5, the two microwave antenna systems 4 of Embodiment 6 of the present disclosure are disposed at the bottom of the base station antenna 2, which is specifically located between the cover 3 of the radio remote unit and the base station antenna 2, the two are also located on both sides of the holding pole 1, and both directly fixed to the holding pole 1, or like Embodiment 5, are hung on both sides of the holding pole 1 by a common mounting bracket 7. In addition, the two microwave antenna systems 4 can be located on the same plane or different planes, and both locations thereof may or may not be adjusted separately as needed. The adjustment way is the same as that of Embodiment 5, that is, the microwave antenna system 4 on each side can be rotated about its vertical center axis as the rotating shaft independently. Two microwave antenna systems 4 can also perform corresponding tilt adjustments in the front-rear direction.

Figure 8:
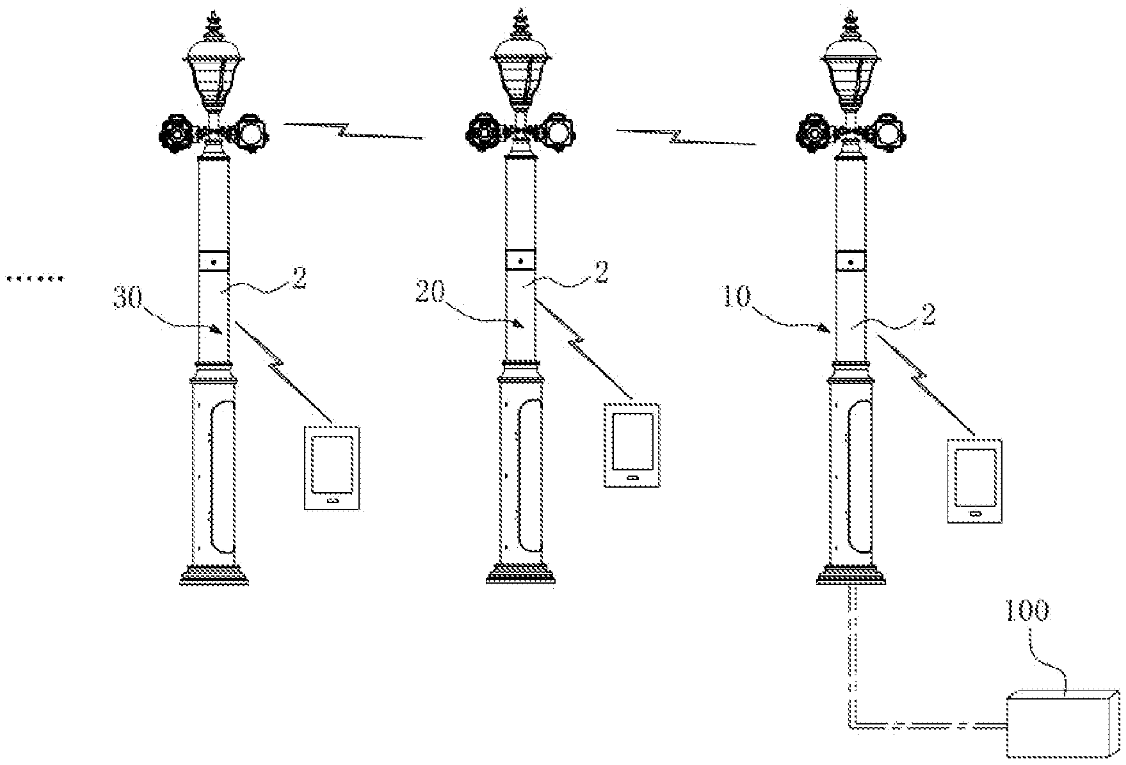
FIG. 8 is a schematic diagram showing a network structure of a communication base station according to an embodiment of the present disclosure.

As shown in FIG. 8, using the above mentioned integrated 5G antenna system, the communication network disclosed from the present disclosure includes the plurality of integrated 5G antenna systems which can achieve bi-directional communication by their microwave antenna systems 4. Among them, the plurality of integrated 5G antenna systems can be any of the integrated 5G antenna systems of the above examples 1-6, may also be the combination of any two or more of the integrated 5G antenna systems of the above examples 1-6.

Preferably, two microwave antenna systems 4 of the two adjacent integrated 5G antenna systems communicating to each other are located or approximately the same height.

The specific operation principle of the communication network of the present disclosure is: when the remote computer room 100 transmits a signal to the radio remote unit of the first 5G antenna system 10, the signal band of the signal is identified as the frequency band coverage of the base station antenna 2 of the first 5G antenna system 10, the signal is transmitted to the end user by the base station antenna 2; when it is identified that the signal band is out of the frequency band coverage of the base station antenna 2 of the first 5G antenna system, the signal is transmitted to the radio frequency unit of the microwave antenna system 4, and to the microwave antenna of the adjacent second 5G antenna system 20 by the microwave antenna of the first 5G antenna system controlled by the radio frequency unit, if the signal band of the signal is within the frequency band coverage of the base station antenna 2 of the second 5G antenna system 20, the signal is transmitted by the base station antenna 2, or the signal is transmitted to the third 5G antenna system 30 by the microwave antenna of the second 5G antenna system 20, and so forth until to the base station antenna 2 to which the frequency band coverage of the base station antenna 2 conforms.

The technical disclosure and technical features of the present disclosure have been disclosed, however, those skilled in the art may make various modifications based on the teachings and disclosure of the invention without departing from the spirit and scope of the invention, therefore, the scope of the invention should not be limited the disclosure disclosed in the examples, but should include various substitutions and modifications that do not depart from the present disclosure, and are covered by the claims of this patent.

What is claimed is:

1. An integrated 5G antenna system, comprising:

a base station system and at least one microwave antenna system integrated on a holding pole, wherein the base station system includes a radio remote unit and at least one base station antenna electrically connected to the radio remote unit and configured to transmit 5G signals; and each of the at least one microwave antenna system includes a radio frequency unit electrically connected to the base station antenna and a microwave antenna electrically connected to the radio frequency unit, wherein the base station system includes two base station antennas configured to transmit the 5G signals, the two base stations antennas are fixedly sleeved on the holding pole and uniformly distributed axially on the holding pole to form an omni-directional antenna, and wherein one of the at least one microwave antenna system is fixed on the holding pole by a mounting bracket, the mounting bracket includes a holding portion configured to hold on the holding pole and a horizontal mounting portion configured to provide a horizontal mounting space for the one microwave antenna system, the horizontal mounting portion is connected to the holding portion by a rotating shaft, position adjustment of the microwave antenna system includes circumferentially rotating about the rotating shaft and rotating about a vertical central axis of the microwave antenna system.

2. The integrated 5G antenna system according to claim 1, wherein there are two microwave antenna systems on the holding pole, and position adjustments of the two microwave antenna systems are configured to be performed synchronously.

3. The integrated 5G antenna system according to claim 1, wherein the 5G antenna system further comprises a beautifying member integrated on a top of the holding pole.

4. The integrated 5G antenna system according to claim 1 wherein the microwave antenna system is provided with a radome.

5. A communication network, comprising a plurality of integrated 5G antenna systems each of the integrated 5G antenna systems comprising:

a base station system and at least one microwave antenna system integrated on a holding pole, wherein the base station system includes a radio remote unit and at least one base station antenna electrically connected to the radio remote unit and configured to transmit 5G signals; and each of the at least one microwave antenna system includes a radio frequency unit electrically connected to the base station antenna and a microwave antenna electrically connected to the radio frequency unit, wherein the base station system includes two base station antennas configured to transmit the 5G signals, the two base stations antennas are fixedly sleeved on the holding pole and uniformly distributed axially on the holding pole to form an omni-directional antenna;

the plurality of integrated 5G antenna systems are configured to perform bi-directional communication to each other through the corresponding microwave antenna systems; and one of the at least one microwave antenna system is fixed on the holding pole by a mounting bracket, the mounting bracket includes a holding portion configured to hold on the holding pole and a horizontal mounting portion configured to provide a horizontal mounting space for the one microwave antenna system, the horizontal mounting portion is connected to the holding portion by a rotating shaft, position adjustment of the microwave antenna system includes circumferentially rotating about the rotating shaft and rotating about a vertical central axis of the microwave antenna system.

6. The communication network according to claim 5, wherein the two microwave antenna systems of two adjacent integrated 5G antenna systems communicating with each other are located on a same height or approximately the same height.

7. The communication network according to claim 6, wherein there are two microwave antenna systems on the holding pole, and position adjustments of the two microwave antenna systems are configured to be performed synchronously.

8. The communication network according to claim 6, wherein there are two microwave antenna systems on the holding pole, and position adjustments of the two microwave antenna systems are configured to be performed separately.

9. The communication network according to claim 6, wherein the 5G antenna system further comprises a beautifying member integrated on a top of the holding pole.

10. The communication network according to claim 6, wherein the microwave antenna system is provided with a radome.

11. The integrated 5G antenna system according to claim 1, wherein there are two microwave antenna systems on the holding pole, and position adjustments of the two microwave antenna systems are configured to be performed separately.

12. An integrated 5G antenna system, comprising:

a base station system and at least one microwave antenna system integrated on a holding pole, wherein the base station system includes a radio remote unit and at least one base station antenna electrically connected to the radio remote unit and configured to transmit 5G signals; and each of the at least one microwave antenna system includes a radio frequency unit electrically connected to the base station antenna and a microwave antenna electrically connected to the radio frequency unit wherein there are two microwave antenna systems on the holding pole, the two microwave antenna systems are located on the holding pole at a same height, and the two microwave antenna systems are fixed on the holding pole by a same mounting bracket, one of the at least one microwave antenna system is fixed on the holding pole by a mounting bracket, the mounting bracket includes a holding portion configured to hold on the holding pole and a horizontal mounting portion configured to provide a horizontal mounting space for the one microwave antenna system, the horizontal mounting portion is connected to the holding portion by a rotating shaft, position adjustment of the microwave antenna system includes circumferentially rotating about the rotating shaft and rotating about a vertical central axis of the microwave antenna system.

* * * * *